Apr. 24, 1923.  1,452,844
J. S. OGBURN
BERRY AND FRUIT WASHING MACHINE
Filed July 29, 1922  2 Sheets-Sheet 1

John S. Ogburn
INVENTOR.
BY John M. Spellman
ATTORNEY

Apr. 24, 1923.  
J. S. OGBURN  
BERRY AND FRUIT WASHING MACHINE  
Filed July 29, 1922  
1,452,844  
2 Sheets-Sheet 2

INVENTOR.  
John S. Ogburn  
BY John M. Spellman  
ATTORNEYS.

Patented Apr. 24, 1923.

1,452,844

UNITED STATES PATENT OFFICE.

JOHN STONE OGBURN, OF LINDALE, TEXAS.

BERRY AND FRUIT WASHING MACHINE.

Application filed July 29, 1922. Serial No. 578,412.

*To all whom it may concern:*

Be it known that I, JOHN STONE OGBURN, a citizen of the United States, residing at Lindale, in the county of Smith and State of Texas, have invented certain new and useful Improvements in Berry and Fruit Washing Machines, of which the following is a specification.

This invention relates to fruit canning and in such connection it relates more particularly to a macihne for washing berries or the like preparatory to the canning thereof.

The principal object of the invention is to provide a machine of this nature which will clean and wash the berries from dirt, trash, etc., in an expeditious and thorough manner and which is automatic in its operation.

Another object of the invention is its relative simplicity, the machine being composed of strong, durable parts.

The above and other objects and features of the machine will be better and more clearly understood by reference to the following description, taken in connection with the accompanying drawings, forming part hereof, in which—

Figure 1:
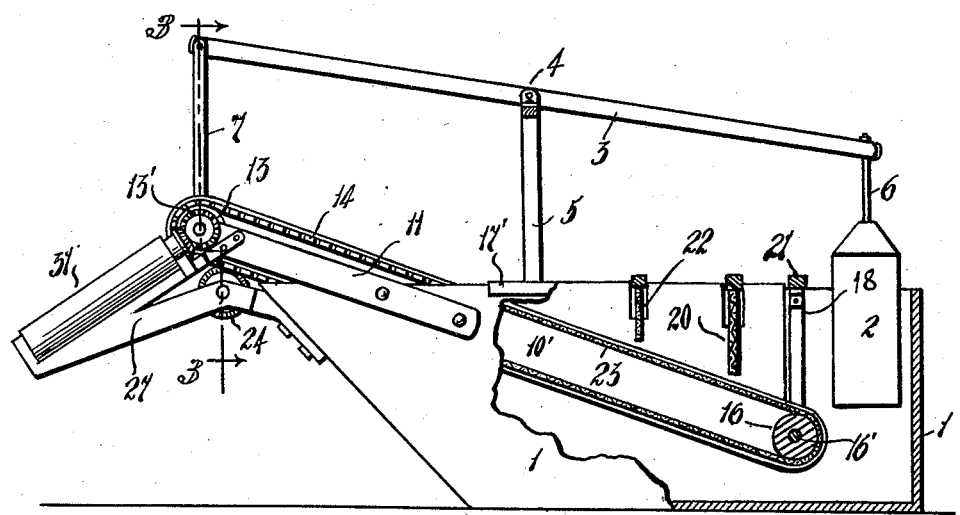
Figure 1 is a side view, partly in section and partly broken away, of the machine embodying the invention.
Figure 2:
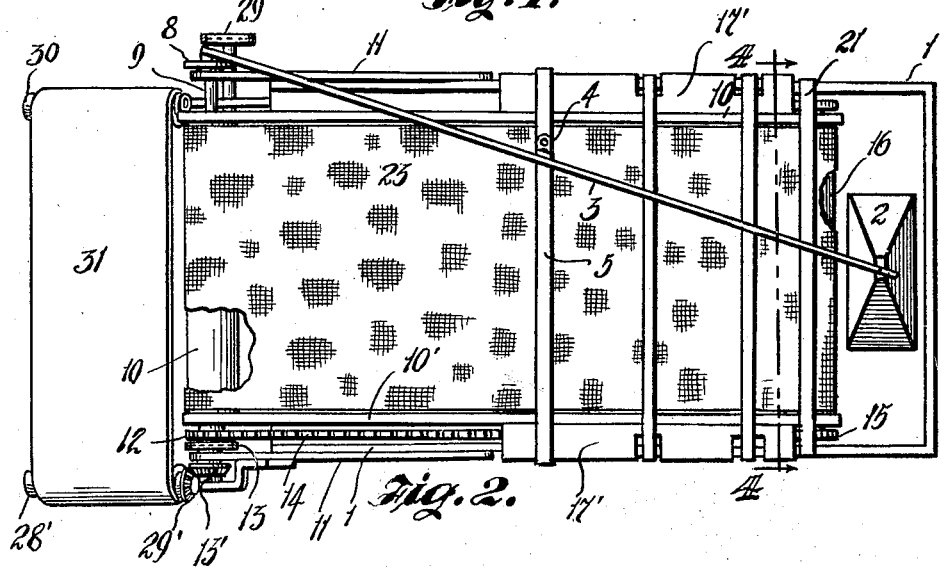
Figure 2 is a top or plan view thereof.
Figure 3:
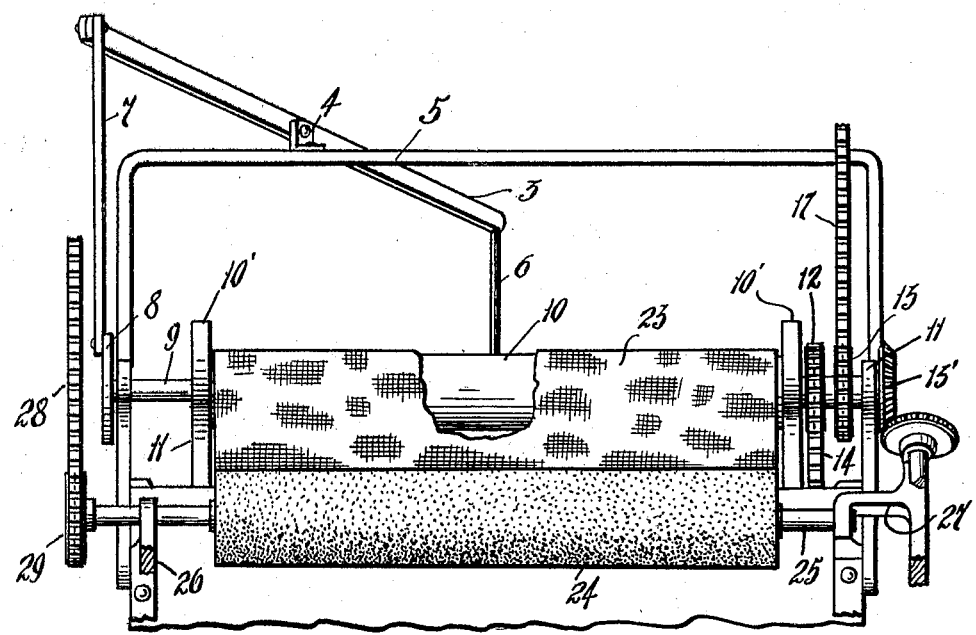
Figure 4:
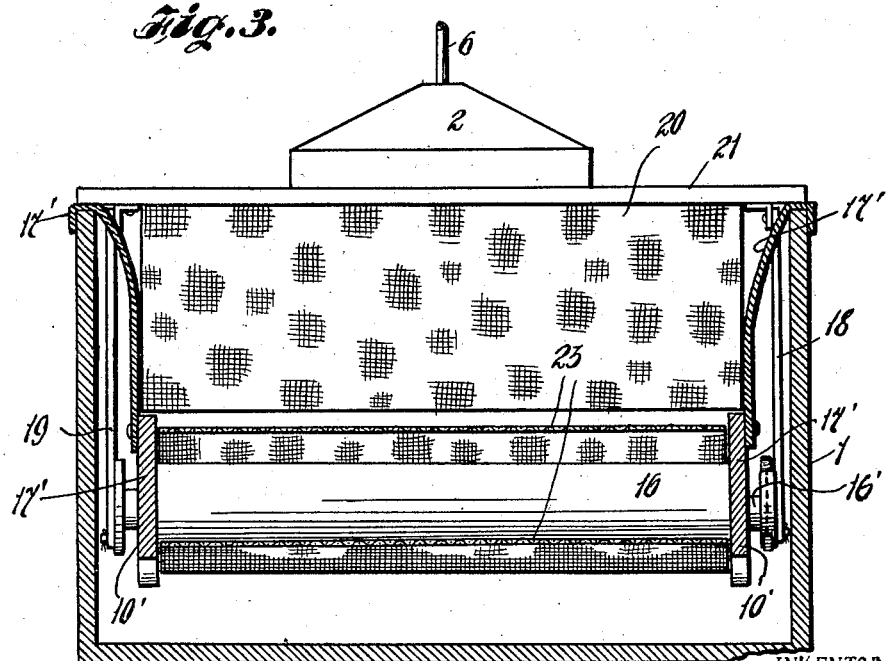

Figures 3 and 4 are enlarged cross-sectional views, taken on lines 3—3 and 4—4, respectively, of Figures 1 and 2.

Referring more in detail to the drawings, 1 denotes a tank for water or liquid in which the berries or fruit are to be washed and provided with an agitator 2. The agitator comprises a hollow wooden box preferably of wood, and closed at its bottom, also at the top and sides, and is suspended at one end of a diagonally arranged beam 3, the beam being centrally pivoted to an angle iron 4 on a cross bar 5, both ends of the bar being secured to the sides of the tank. One end of beam 3 has a rod 6 to support the agitator 2 and the opposite end of beam 3 has a pitman rod 7 pivoted to a pulley 8 carried on one end of a shaft 9 and so arranged that on rotation of the shaft 9 the pitman rod will cause the beam 3 to alternately raise and lower the agitator 2. This up and down movement of the agitator will displace some of the water and raise and lower the water level in the tank and move the berries up and down and around in the water and wash and remove the dirt and trash therefrom.

Arranged upon the shaft 9 is a roller 10 supported at each end in bearings 11—11. One end of the shaft 9 has two sprockets 12 and 13. Sprocket 12 carries a chain 14 which is inclined downwardly and connected to a second sprocket 15 on a companion roller 16 which is immersed in the water in tank 1. Sprocket 13 is connected by chain 17 with drive means from any suitable source of power. Roller shaft 9 also carries a bevel gear 13' referred to hereinafter. Between the rollers 10 and 16 are frame members 10—10' which form a guide for the sides or edges of a screen belting 23 and which retain the screen belting in alinement with the rollers and also providing a framework.

On each end of the lower roller 16 are pitman rods 18 and 19. These rods are connected to a cross bar 21 fastened to the sides of the tank 1, and are for the purpose of raising and lowering a screen belting or conveyor. Roller 16 has a shaft 16' supported by the side members 10', the lower ends of which members are secured to a member 17' overlapped and set loosely on each side of the tank. The arrangement of the pitman rods provides an eccentric movement to the screen belting and adjacent parts causing them to rise and fall in the water and forcing the water through the screen in addition to the action of the agitator 2. The machine may, however, be effectually operated with or without the agitator.

Gates 20 and 22 of wire mesh are for the purpose of allowing the berries to be drawn thereunder, but prevent leaves and dirt or trash from passing outward upon the screen conveyor.

Underneath the roller 10 is a brush 24 carried on a shaft 25, the shaft being seated in bearings 26 and 27. This brush is for the purpose of keeping the screen clear and clean of trash and dirt from the berries and is rotated by a chain 28 connected to a sprocket 29 and operated by the same source of power which drives chain 17.

Referring to Figure 3, bearing 27 also forms a support for a roller shaft 28' with a bevel gear 29' meshing with gear 13' and at the opposite side of the machine is a second roller shaft 30 which has its bearings formed from a continuation of bearing 26. Upon these two roller shafts is a belting 31 of canvas or the like which, owing to the slant of the roller shafts forms an incline and upon which the berries or fruit are delivered from the screen belting 23. The object of the belt 31 is to catch and hold leaves or like matter from the berries which adhere to the belt on account of its wetness or damp condition.

From the foregoing it will be apparent that the water or liquid in the tank, owing to the up and down movement of screen 23 and agitator 2, is forced through the screen conveyor carried on the rollers and the side members which comprise a frame will serve to permit the water to pass freely through the screen in an up and down motion but not laterally as the side members prevent this side flow. The berries are placed in the end of the tank between the agitator and screen gate 20 and will ordinarily float on the top of the water, but will be swirled and edied about by the wavy motion of the water in the tank and drawn under the screens 20 and 22, as the berries are fed outward upon the conveyor 23. Trash, dirt and the like is prevented from moving outward by the screen gates as such material will float on the surface of the water. Both screen gates 20 and 22 can be lifted upward and adjusted by hand as required to properly feed the berries outward from time to time from the machine. Any leaves or the like which happen to pass out upon the conveyor will be caught upon the belt 31.

What is claimed is—

1. A berry cleaning and washing machine comprising a tank, a traveling and oscillating conveyor screen inclined therein; an agitator; screen gates controlling the outward movement of the berries; a brush co-acting with the conveyor screen to clean the screen, and a belt means adapted to travel in a direction at an angle to that of the conveyor screen for collecting leaves and trash from the berries or fruit, on final delivery thereof.

2. A machine of the class described, comprising a tank for liquid in which the berries are contained; a screen conveyor for delivering the berries from the machine; means for oscillating the screen conveyor in the tank to force the water therethrough and move and draw the berries under the water in the washing and delivery process; means for actuating the screen conveyor to carry the berries from the machine; an agitating means for augmenting the movement of the water through the screen conveyor in the cleaning and delivery of the berries; gates for controlling the outward movement of the berries and retaining trash and leaves, etc.; a rotating brush for cleaning the conveyor screen; and a belt means upon which the berries are delivered and for collecting leaves and the like thereon.

3. In a machine for washing berries and the like; a tank containing liquid in which the berries are contained; an agitating means; a beam pivoted on a bar above the tank and supporting from one of its ends the agitating means above mentioned; a pitman rod on the other end of said beam; rollers provided with shafts, said rollers spaced apart in a frame, and one of which shafts is connected to said pitman rod to operate the beam and agitating means; a screen conveyor adapted to pass over and around said rollers; pitman rods connected to the lower roller shaft and affixed to the tank to oscillate the lower end of the screen conveyor; screen gates for controlling the passage of berries; a brush co-acting with said screen conveyor for cleaning the conveyor from dirt; and a traveling belt means adjacent the outer end of said screen conveyor adapted to catch leaves and trash upon the delivery of the berries.

In testimony whereof I have signed my name to this specification.

JOHN STONE OGBURN.